United States Patent
Ly et al.

(10) Patent No.: US 9,541,723 B2
(45) Date of Patent: Jan. 10, 2017

(54) REDUCED DIAMETER MULTIMODE OPTICAL FIBER CABLES

(71) Applicant: OFS FITEL, LLC, Norcross, GA (US)

(72) Inventors: Heng Ly, Stone Mountain, GA (US); Peter A Weimann, Atlanta, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/771,910

(22) PCT Filed: Mar. 4, 2013

(86) PCT No.: PCT/US2013/028848
§ 371 (c)(1),
(2) Date: Sep. 1, 2015

(87) PCT Pub. No.: WO2014/137313
PCT Pub. Date: Sep. 12, 2014

(65) Prior Publication Data
US 2016/0011389 A1    Jan. 14, 2016

(51) Int. Cl.
*G02B 6/44* (2006.01)
(52) U.S. Cl.
CPC ........... *G02B 6/4432* (2013.01); *G02B 6/4436* (2013.01)
(58) Field of Classification Search
None
See application file for complete search history.

(56) References Cited

U.S. PATENT DOCUMENTS

| | | | | |
|---|---|---|---|---|
| 5,390,273 A * | 2/1995 | Rahman | ............... | G02B 6/4403 385/112 |
| 6,370,303 B1 * | 4/2002 | Fitz | ....................... | G02B 6/4436 385/113 |
| 6,993,227 B2 * | 1/2006 | Lee | ....................... | G02B 6/4413 385/103 |
| 7,720,338 B2 * | 5/2010 | Graveston | ............ | G02B 6/4432 385/100 |
| 8,655,127 B2 * | 2/2014 | Leonard | ................. | G02B 6/441 385/102 |
| 2008/0037942 A1 * | 2/2008 | Tatat | ..................... | G02B 6/4433 385/113 |
| 2008/0285924 A1 * | 11/2008 | Graveston | ............ | G02B 6/4432 385/102 |
| 2009/0087154 A1 * | 4/2009 | Bradley | ............... | G02B 6/4432 385/113 |
| 2010/0158457 A1 * | 6/2010 | Drozd | .................. | G02B 6/4435 385/113 |
| 2010/0322572 A1 * | 12/2010 | Sakabe | ................. | C03C 25/106 385/100 |
| 2012/0057833 A1 * | 3/2012 | Tatat | ..................... | G02B 6/443 385/111 |

* cited by examiner

*Primary Examiner* — Sung Pak
(74) *Attorney, Agent, or Firm* — Wendy W. Koba, Esq.

(57) ABSTRACT

Described are new cable designs for indoor installations wherein the cable comprises a dual-layer optical fiber buffer encasement of acrylate resin. The buffer encasement has an acrylate compliant inner layer that protects the fiber and minimizes stress transfer to the fiber; and a hard, tough acrylate outer layer that provides crush resistance. The dual-layer optical fiber buffer encasement is wrapped with reinforcing yarn and encased in an outer protective jacket. The protective jacket is relatively thick and rigid, having a thickness of 0.7-3.0 mm, and a modulus greater than 240 MPa.

10 Claims, 2 Drawing Sheets

REDUCED DIAMETER MULTIMODE OPTICAL FIBER CABLES

FIELD OF THE INVENTION

This invention relates to multimode optical fiber cables.

BACKGROUND OF THE INVENTION

(Parts of this background may or may not constitute prior art.)

It has now been several decades since the start of the transition from copper wire telecommunications cable to optical fiber cable. In that transition the biggest change by far is the sensitivity of glass optical fibers to stresses in the cable. The electrical transmission properties of copper are relatively immune to mechanical forces. In contrast, the light transmission properties of optical fibers are significantly impacted by mechanical stresses on the optical fiber cable. There is a variety of these effects, and a variety of causes. This makes optical fiber cable design, while simple in concept, extremely complex in practice.

For many years Standard Multimode optical fiber (MMF) was manufactured with a core size of 62.5 and an overall dimension of 125 microns. Now, 50-Micron Multimode Fiber (50-MMF) is gaining popularity due to its expanded bandwidth and transmission distance potential over traditional multimode fiber runs. Providing nearly three times the bandwidth over twice the distance, 50-MMM fiber is recommended for new premise applications including intra-building connections.

However, compared to single mode fiber and 62.5MMF, 50-MMF tends to be far more sensitive to signal attenuation resulting from fiber microbending or macrobending caused by mechanical stress. As a result, recent studies show that some 50-MMF optical fiber cables can show significant signal attenuation in standardized mechanical qualification tests, while older SMF cables show minimal signal attenuation in those tests.

This problem is exacerbated by end-user demand for smaller optical fiber cables with increased fiber packing density. Traditionally, indoor distribution cables with 50-MMF employ tight buffer coatings over each individual fiber, to provide mechanical protection to the individual fibers. Common tight buffer diameters include 900 micron and 600 micron. Distribution or trunk cables employing tight-buffered fibers tend to be large and bulky, providing challenges to the end-user. First, it is often difficult for end-users to route these large cables directly to connection or interconnection points on equipment, or within shelves or trays. End-users must often transition from the large buffered fiber distribution cable to smaller, flexible interconnect cables. However, this adds cost and complexity to installations. Second, in large data centers or storage-area networks, a large number of distribution cables are often needed for interconnection of equipment. Use of large distribution cables can fill up limited space in overhead or underfloor cable trays, as well as restricting flow of cooling air. There is end-user demand for compact, high-density distribution cables with 50-MMF which can be directly routed to interconnection points.

STATEMENT OF THE INVENTION

To address these problems, we propose a new 50-MMF cable design for indoor installations. The cable comprises a dual-layer optical fiber buffer encasement multiple 50-MMF fibers in a thermoset acrylate resin, combined with other layers having mechanical properties that, combined together, recover the transmission performance required to meet international industry standards. The buffer encasement comprises a compliant acrylate inner layer that protects the fiber and minimizes stress transfer to the fiber, and a hard, tough acrylate outer layer that provides robustness and crush resistance. The dual-layer optical fiber buffer encasement is wrapped with a reinforcing layer and encased in an outer protective jacket. To meet industry requirements for fire protection, flame retardants are added to the cable. These also affect the mechanical interactions described earlier.

DETAILED DESCRIPTION

As stated above, optical fiber cable design, while simple in concept, is extremely complex in practice. A major reason for the complexity is the large number of factors that intervene between a mechanical force applied at the exterior boundary of an optical fiber cable, and the glass optical fibers, sometimes buried deep within the cable. In tracing a force being translated through the cable from the source to the optical fiber, many material interfaces are traversed. For example, the optical fiber cable design described and claimed in U.S. Pat. No. 7,720,338, a very successful commercial singlemode fiber product offered by OFS Fitel, LLC. as AccuPack™, the force crosses seven interfaces bounding six layers of materials, each having different mechanical properties. Some of these can be predicted, following existing established models, while many cannot. It can be appreciated intuitively that the impact of a change in any layer, or layers, may have complex and unforeseen consequences. As a result, modern optical fiber cable design follows a path of using sophisticated mechanical design tools combined with costly and expensive empirical studies. This background explains in part why a seemingly straightforward change in the dimensions of the optical fibers in a known optical fiber cable design may result in performance degradation, and why fixing that degradation is not an obvious matter.

The cable design referred to above described above performs extremely well when the optical fibers are single mode. However, when 50-MMF are substituted, the cable performance is degraded. Reasons for this degradation were explored and it was found that the properties of the outer jacket have greater impact on the mechanical and optical performance of the cable than previously thought. Of the seven interfaces and six material layers described earlier as influencing the transmission performance of the optical fibers deep within the cable, the cable jacket is the farthest removed. Thus it was expected to have minimal influence on the optical fibers. However, empirical studies have demonstrated otherwise.

Design complexity is such that changing any one of the many design parameters may be modeled in an attempt to predict the mechanical stress profile for the overall cable these turn out to be best estimates only, and not always accurate. If the predictions were accurate it would be possible to write algorithms for cable design, and the industry would accept those as characterizing commercial product. But the industry recognizes the complexity of multilayer cable design, and the inability to accurately predict the consequence of design changes. This, to the point that international industry cable standards require empirically measured performance data before a manufacturer can represent that a cable design is acceptable according to industry standards.

Figure 1:
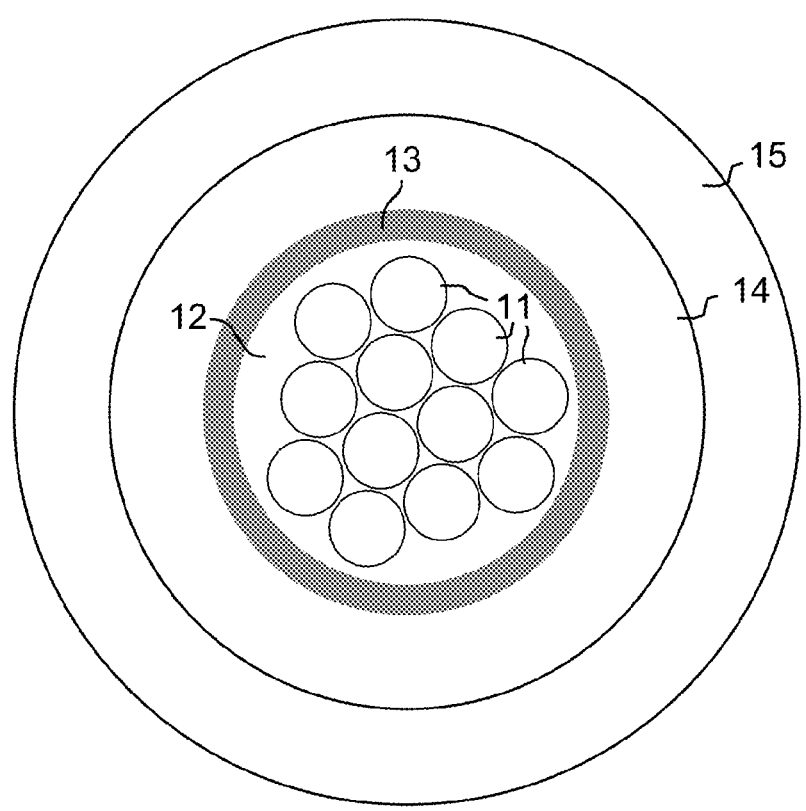
FIG. 1 is a schematic view of a cable design of the invention showing the dual-layer optical fiber buffer encasement, the aramid yarn layer and the outer jacket.

Referring to FIG. 1, a twelve 50-MMF fiber embodiment of the invention is shown with the twelve 50-MMF optical fibers 11, encased and embedded in a soft acrylate matrix 12. The elements in the figures are not drawn to scale. Surrounding and encasing the soft acrylate matrix is a relatively hard acrylate encasement layer 13. Together, the 50-MMF optical fibers, the acrylate matrix, and the acrylate encasement layer, comprise a round dual layer optical fiber buffer encasement. In this embodiment the optical fiber buffer encasement contains 12 50-MMF optical fibers, but may contain from 2-24 optical fibers. Optical fiber buffer encasements with 4 to 12 50-MMF optical fibers may be expected to be most common in commercial practice.

The dual-layer acrylate construction of the optical fiber buffer encasement, with the soft inner layer and hard outer layer, functions to minimize transfer of bending and crushing forces to the optical fibers, thus minimizing signal attenuation. Alternatively the optical fiber buffer encasement may have an oval cross section.

The term matrix is intended to mean a body with a cross section of matrix material in which other bodies (optical fibers) are embedded. Encasement is intended to mean a layer that both surrounds and contacts another body or layer.

The soft acrylate matrix and the hard acrylate encasement are preferably UV-curable acrylates. Other polymers may be substituted. The UV-curable resins may contain flame-retardants to improve the overall fire resistance of the cable. The acrylates may be clear or color coded. The color code, or other suitable marking, may indicate the type of fiber, 50-MM, and the flame retardant characteristics.

Alternatively, a flame retardant polymer layer may be extruded over the dual layer optical fiber buffer encasement. This may be useful in especially demanding applications, for meeting the NFPA 262-2011 Plenum fire standard. The extruded flame-retardant coating may be made from: PVC, low-smoke PVC, PVDF, FEP, PTFE, compounded fluoropolymer blends, low-smoke zero halogen polyolefin-based resins, flame retardant thermoplastic elastomers, and flame retardant nylons. Specific examples are Dow Chemical DFDE-1638-NT EXP2 non-halogen resin, and 3M Dyneon 31508/0009 PVDF.

The NFPA 262-2011 fire protection standard is a rigorous flame retarding test used throughout the industry. It is available from the National Fire Protection Association. The test is straightforward and, for brevity, the details are not repeated here. This standard applies to the overall cable designs described in this specification. Other fire protection standards are used in the industry, for example the IEC 60332-3-24 flame spread test and IEC 61034-2 smoke emission test. In general, international flame retardant standards may be referred to as Class D, Class C, or Class B2 of the EN 50399 fire safety test. The cable designs described here, with suitable flame and/or smoke retardants, are designed to meet these standards. As a general prescription, these are referred to as fire protection standards.

In some industry applications there is also a requirement that the optical fiber cable be devoid of halogen-containing materials. These are referred to as non-halogen cables. The teachings herein apply in a general sense to non-halogen cables.

The optical fiber buffer encasement is encased with a wrap 14 of reinforcing yarn, preferably polyaramid, although glass yarn could be used. The yarn may be run straight or may be helically twisted. An outer flame-retardant polymer jacket 15 is formed around the buffer encasement and the reinforcing yarn. Suitable jacket polymers are PVC, low-smoke PVC, PVDF, FEP, PTFE, compounded fluoropolymer blends, low-smoke zero halogen polyolefin-based resins, flame retardant thermoplastic elastomers, and flame retardant nylons. The jacket polymer may contain UV stabilizers to allow use of the cable in exposed environments.

An advantage of using UV-cured acrylates in the dual-layer acrylate buffer encasement is that the cabling operation used to apply UV-cured coatings is rapid and cost effective. The following describes the production of the dual-layer acrylate buffer encasement at high cabling speeds. The method used is to apply the coating material as a prepolymer, and cure the prepolymer using UV light. The dual-layer acrylate coatings are applied in tandem or simultaneously (using a two compartment dual die applicator). In the tandem method, sometimes referred to as "wet on dry", a first coating layer is applied, and cured, and the second coating layer is applied over the cured first layer, and cured. In the simultaneous dual coating arrangement, sometimes referred to as "wet on wet" both coatings are applied in a prepolymer state, and cured simultaneously. The UV curable polyacrylate prepolymers are sufficiently transparent to UV curing radiation, i.e., wavelengths typically in the range 200-400 nm, to allow full curing at high draw speeds. Other transparent coating materials, such as alkyl-substituted silicones and silsesquioxanes, aliphatic polyacrylates, polymethacrylates and vinyl ethers have also been used as UV cured coatings. See e.g. S. A. Shama, E. S. Poklacki, J. M. Zimmerman "Ultraviolet-curable cationic vinyl ether polyurethane coating compositions" U.S. Pat. No. 4,956,198 (1990); S. C. Lapin, A. C. Levy "Vinyl ether based optical fiber coatings" U.S. Pat. No. 5,139,872 (1992); P. J. Shustack "Ultraviolet radiation-curable coatings for optical fibers" U.S. Pat. No. 5,352,712 (1994). The coating technology using UV curable materials is well developed. Coatings using visible light for curing, i.e. light in the range 400-600 nm, may also be used. The preferred coating materials are acrylates, or urethane-acrylates, with a UV photoinitiator added.

Examples of coating materials suitable for use in the optical fiber buffer encasement of the cables of the invention are:

|  | INNER LAYER | OUTER LAYER |
| --- | --- | --- |
| Example 1 | DSM Desotech DU-1002 | DSM Desotech 850-975 |
| Example 2 | DSM Desotech DU-0001 | DSM Desotech 850-975 |
| Example 3 | DSM Desotech DU-1003 | DSM Desotech 850-975 |

The inner layer and outer layer materials may be characterized in various ways. From the general description above it is evident that the modulus of the inner layer should be less than the modulus of the outer layer. Using the ASTM D882 standard measurement method, the recommended tensile modulus for the inner layer is in the range 0.1 to 50 MPa, and preferably 0.5 to 10 MPa. A suitable range for the outer layer is 100 MPa to 2000 MPa, and preferably 200 MPa to 1000 MPa.

The layer materials may also be characterized using glass transition temperatures. It is recommended that the $T_g$ of the inner layer be less than 20 degrees C., preferably less than 0 degrees C., and the $T_g$ of the outer layer greater than 40 degrees C. For the purpose of this description the glass transition temperature, Tg, is the point in the middle of the transition curve. Tg may also be generally defined as the peak of the tan delta curve in a dynamic mechanical analysis (DMA) plot.

Suitable aramid yarn for the aramid layer is available from Teijin Twaron BV, identified as 1610 dTex Type 2200 Twaron yarn. The yarn may be run straight or with a twist.

The cable dimensions are largely determined by the size of the dual-acrylate subunit. A typical diameter for the 12 fiber buffer encasement described above is 1.425 mm. In most embodiments the buffer encasement diameter, for 2 to 12 fibers, will be less than 2 mm. The reinforcing yarn layer and the outer jacket typically add 2 to 3 mm to the cable diameter.

The thickness of the outer jacket may be, for example, 0.7-3.0 mm, preferably 1.0 to 2.0 mm. The modulus of the outer jacket is greater than 240 MPa, and in some preferred embodiments, 300-500 MPa. This modulus range, along with a thickness range just specified, is recommended in order to meet the performance standards described here. One example of an effective jacket is a 1.06 mm thick jacket of Dyneon SOLEF 31508/0009. In another preferred embodiment, the jacket is PolyOne ECCOH 5700 low-smoke zero-halogen.

Figure 2:
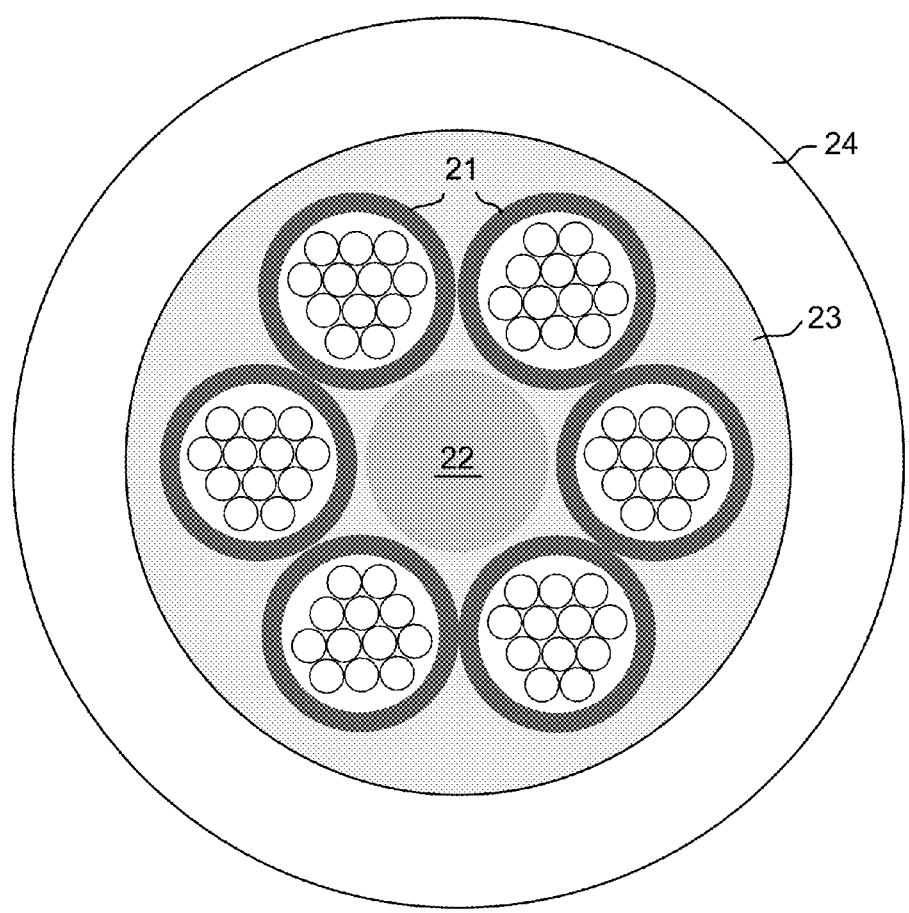
FIG. 2 is a schematic view of a larger fiber count cable wherein a plurality of dual-layer optical fiber buffer encasements are cabled together.

Optical fiber cables with more than one multiple fiber buffer encasement offer an attractive alternative design, one that produces increased fiber count while still relatively small and compact. Buffer encasements of any number, for example 2-12, can be combined in a single jacket. Efficient packing is obtained in a cable with 6 optical fiber buffer encasements 21, as shown in FIG. 2. This design has a central strength member 22 to aid in organizing the buffer encasements, within the aramid yarn layer 23 and outer jacket 24. Alternatively, the center space may be occupied by another optical fiber buffer encasement. As mentioned above, the individual optical fibers may be color coded to aid in identifying and organizing the optical fibers for ribbonizing, connectorizing, or splicing. In the embodiment shown in FIG. 2, the cable jackets may also be color coded to provide additional aid in organizing the optical fibers.

As in the embodiment of represented by FIG. 1, the thickness of the outer jacket is, for example, 0.7-3.0 mm, and preferably 1.0 mm to 2.0 mm. Again, a minimum of. 0.7 mm, or 1.0, is expected to allow the cable design to meet the performance standards described here. As one example of an effective jacket is a 1.0-2.0 mm thick jacket of Dyneon SOLEF 31508/0009.

The compact size of the optical fiber buffer encasement allows for manufacture of smaller cables than typically found in competing cable designs. For example, the cable design of the invention allows production of cables with four encasements of twelve fibers having an OD of 5 mm or less.

It will be evident to those skilled in the art that UV cured acrylate resins contain photoinitiators that can be identified in the final cable product. Any suitable photoinitiator may be used in implementing the invention.

As previously mentioned, the cable described in conjunction with FIG. 2 is designed to meet industry standards when 50-MMF is used in the cable. Performance testing of cables described above according to North American ICEA-S-596 and Telcordia GR-409 standards shows the values in the following table.

| Test | North American Industry Standard Requirements | Results, ΔLoss, 1300 nm, 50-MMF |
|---|---|---|
| Tensile, 150 lbf load | None | 0.06 dB, avg<br>0.10 dB, max |
| Tensile, 60 lbf load | 90% < 0.3 dB (GR-409)<br><0.60 dB (ICEA-596) | 0.07 dB, avg<br>0.10 dB, max |
| Compression, 10 N/mm load | <0.4 dB (GR-409)<br><0.60 dB (ICEA-596) | 0.13 dB, avg<br>0.38 dB, max |
| Twist, 0.3 m gauge length | <0.4 dB (GR-409) | 0.10 dB, max |
| Cyclic Flex, 152 mm mandrels | <0.4 dB (GR-409) | −0.01 dB, max |
| Impact, 2 kg | <0.4 dB (GR-409) | 0.07 dB, max |
| Low Temperature Bend, −20 C. | <0.4 dB (GR-409) | 0.02 dB, max |
| High Temperature Bend, 70 C. | <0.4 dB (GR-409) | 0.02 dB, max |
| Temperature Cycling, 0 C. | <0.6 dB/km (GR-409)<br><0.60 dB/km (ICEA-596) | 0.14 dB/km, avg<br>0.34 dB/km, max |
| Temperature Cycling, 70 C. | | 0.03 dB/km, avg<br>0.08 dB/km, max |
| Temperature Cycling, −20 C. | | 0.16 dB/km, avg<br>0.32 dB/km, max |

More details relevant to the materials and cable designs of the invention may be found in U.S. Pat. No. 7,720,338, and PCT/US12/48517, both of which are incorporated herein by reference.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

The invention claimed is:
1. An optical fiber cable comprising:
   (a) at least one optical fiber buffer encasement, each encasement comprising:
      i. at least two 50 micron multimode optical fibers encased in a polymer matrix, the polymer matrix comprising a UV cured acrylate having a modulus in the range 0.5 to 10 MPa,
      ii. a UV cured acrylate polymer encasement, with a modulus in the range 200 MPa to 1000 MPa encasing the polymer matrix, the acrylate polymer encasement and the polymer matrix having a round cross section,
   (b) a yarn wrap strength layer surrounding a grouping of the at least one optical fiber buffer encasements,
   (c) a cable jacket surrounding the yarn wrap strength layer, the first cable jacket consisting essentially of polymer material having:
      i. a round cross section,
      ii. a thickness of 0.7-3.0 mm,
      iii. a modulus greater than 240 MPa,
   (d) sufficient flame retardant to meet one or more industry fire protection standards.
2. The optical fiber cable of claim 1 wherein the optical fiber cable comprises more than one encasement.
3. The optical fiber cable of claim 2 wherein the optical fiber cable comprises 2-12 encasements.

4. The optical fiber cable of claim 2 wherein the glass transition temperature of the polymer encasement is greater than 40 degrees C.

5. The optical fiber cable of claim 2 wherein the yarn wrap is polyaramid yarn.

6. The optical fiber cable of claim 2 wherein the modulus of the cable jacket is in the range of 300-500 MPa.

7. The optical fiber cable of claim 2 wherein the thickness of the cable jacket is in the range 1.0-2.0 mm.

8. The optical fiber of claim 2 wherein the standard of limitation (d) is the National Fire Protection Association NFPA 202-2011 standard.

9. The optical fiber of claim 2 wherein the standard of limitation (d) is selected from the group consisting essentially of NFPA 262-2011, IEC 60332-3-24, IEC 61034-2, Class D, Class C, and Class B2 of the EN 50399.

10. The optical fiber cable of claim 2 wherein the optical fiber cable is a non-halogen cable.

* * * * *